United States Patent [19]

Quaeck

[11] Patent Number: 5,340,264

[45] Date of Patent: Aug. 23, 1994

[54] RECIPROCATING FLOOR CONVEYOR

[76] Inventor: Manfred W. Quaeck, 1515-210th Ave. NE., Redmond, Wash. 98053

[21] Appl. No.: 979,666

[22] Filed: Nov. 20, 1992

Related U.S. Application Data

[63] Continuation-in-part of Ser. No. 885,231, May 18, 1992, which is a continuation-in-part of Ser. No. 874,372, Apr. 27, 1992, abandoned.

[51] Int. Cl.⁵ .............................................. B65G 25/04
[52] U.S. Cl. .................... 414/525.9; 198/750; 91/170 R; 91/508; 91/519; 414/355; 414/573
[58] Field of Search ............... 414/525.9, 525.1, 355, 414/356, 573, 574; 91/530, 508, 519, 170 R; 198/750, 773, 774.1, 775

[56] References Cited

U.S. PATENT DOCUMENTS

| | | |
|---|---|---|
| Re. 33,196 | 4/1990 | Foster . |
| 3,534,875 | 10/1970 | Hallstrom . |
| 4,143,760 | 3/1979 | Hallstrom . |
| 4,144,963 | 3/1979 | Hallstrom . |
| 4,157,761 | 6/1979 | Debor . |
| 4,184,587 | 1/1980 | Hallstrom . |
| 4,492,303 | 1/1985 | Foster . |
| 4,611,708 | 9/1986 | Foster . |
| 4,679,686 | 7/1987 | Foster . |
| 4,691,819 | 9/1987 | Hallstrom . |
| 4,727,978 | 1/1988 | Hallstrom . |
| 4,749,075 | 6/1988 | Foster . |
| 4,785,929 | 11/1988 | Foster . |
| 4,793,468 | 12/1988 | Hamilton et al. .................... 198/750 |
| 4,821,868 | 4/1989 | Foster ......................... 414/525.9 X |
| 4,856,645 | 8/1989 | Hallstrom . |
| 4,940,132 | 7/1990 | Foster . |
| 4,962,848 | 10/1990 | Foster ......................... 198/750 |
| 5,064,052 | 11/1991 | Foster . |
| 5,088,595 | 2/1992 | Hallstrom . |
| 5,096,356 | 3/1992 | Foster . |
| 5,103,866 | 4/1992 | Foster . |
| 5,125,502 | 6/1992 | Foster . |
| 5,193,661 | 3/1993 | Foster ......................... 198/750 |
| 5,222,593 | 6/1993 | Quaeck ........................ 198/750 |
| 5,228,555 | 7/1993 | Hallstrom ................... 414/525.9 X |

*Primary Examiner*—Frank E. Werner
*Attorney, Agent, or Firm*—Graybeal Jackson Haley & Johnson

[57] ABSTRACT

A reciprocating floor conveyor has at least three groups of one or more individually reciprocatable slat members. A drive engages each slat group and moves more than half of the slat members simultaneously in a conveying direction and moves the remainder of the slat members in the opposite direction at least at about twice the rate of speed. The drive includes a fluid pressure source, a flow divider connected to the fluid pressure source which provides a separate, equal rate of flow for each slat group, a separate extensible fluid driven cylinder for reciprocation of each slat group that is connected to a separate flow from the flow divider, a direction valve for each fluid driven cylinder which controls fluid flow into and out of the cylinder, and an unloading valve communicating with the interconnected rod sides of the fluid driven cylinders. The direction valves each have a first position in which the piston side of the fluid driven cylinder is connected to the flow divider such that the fluid driven cylinder and the engaged slat member extend, and a second position in which the rod side of the fluid driven cylinder is connected to the flow divider such that the fluid driven cylinder and the engaged slat member retract. The unloading valve, in one position, directs flow from the extending cylinders to accelerate the retracting cylinder. The retracted cylinder remains stationary in its retracted position until one of the extending cylinders has extended a predetermined distance.

19 Claims, 6 Drawing Sheets

RECIPROCATING FLOOR CONVEYOR

BACKGROUND OF THE INVENTION

This application is a continuation-in-part of U.S. patent application Ser. No. 07/885,231, filed May 18, 1992, entitled RECIPROCATING FLOOR CONVEYOR, which is a continuation-in-part of U.S. patent application Ser. No. 07/874,372, filed Apr. 27, 1992, now abandoned.

The invention pertains to reciprocating conveyors, and more specifically, to reciprocating conveyors which provide continuous movement of a load thereon.

Reciprocating conveyors providing continuous movement are generally known in the art. U.S. Pat. No. 4,580,678, issued to Foster, discloses a reciprocating floor conveyor system in which a group of six floor slat members, staggered in position relative to each other, are each first advanced and then sequentially returned such that five slats are moving forwardly while one slat moves in the return direction. The Foster reciprocating floor conveyor requires two separate sources of hydraulic pressure, one for advancing the floor slat members and another for retracting the floor slat members. This requirement for two separate hydraulic pressure sources increases the cost and complexity of the mechanism. More importantly, the reciprocating floor conveyor of Foster does not provide hydraulic flow of a constant rate, regardless of flow pressure, to each individual slat. Thus, if some slats experience a greater load than others, the slats experiencing this greater load will move a lesser distance than the slats experiencing a lesser load, or not at all, and the sequential advance of the slats will be disrupted due to this lack of substantially constant flow rate in the respective hydraulic lines. Finally, the reciprocating floor conveyor of Foster lacks a hydraulic drive system which maintains the timing and synchronization of the slat reciprocation by preventing cumulative error caused by, for example, numerous cycles of minute hydraulic pressure variations.

U.S. Pat. No. 4,144,963, issued to Hallstrom, discloses a reciprocating conveyor in which at least three elongate slats are employed such that there are always a greater number of slats moving simultaneously in a conveying direction than the number of slats moving in the opposite direction. In order to achieve the above slat movement, the Hallstrom patent requires a complex fluid pressure control valve having relatively movable first and second valve members. The first valve member has a plurality of first passageways each communicating with a different extensible fluid pressure cylinder. The second valve member has a common second passageway communicating simultaneously with more than half of the first passageways, and a third passageway communicating with the remaining first passageway. One of the first valve member and the second valve member is moved relative to the other to communicate the second and third passageway selectively with different ones of the first passageways. In addition to the above unduly complex fluid pressure control valve, the Hallstrom patent is also limited by the fact that, like the above Foster patent, substantially constant flow rate, regardless of flow pressure, is not provided. Thus, as stated above, the presence of unequal loads on respective slats will cause disproportionate slat movement resulting in disruption of the slat sequence. Additionally, the Hallstrom conveyor does not compensate for the above described cumulative error to maintain timing and synchronization of slat reciprocation.

Conveyors for moving large loads, such as cotton bales, are also known in the art. However, these bale conveyors are not comprised of reciprocatable slats but instead have rotating chain belts which partially project through the conveyor floor. The bales are gripped by these chain belts and are urged forwardly along the conveyor. The gripping of the bales by the chain belts loosens fibers from the bales which become trapped in the conveyor mechanism. Additionally, movement of the bales on the conveyor is not substantially continuous but is sequential and of variable speed. More specifically, three of these conveyors are often aligned such that three bales can be fed into a cotton shredder or the like. While a cotton bale is located on the conveyor closest to the shredder, this conveyor feeds the bale slowly into the shredder. At this time, the bales on the other two conveyors more remotely located from the shredder also slowly advance bales thereon. When the first bale has been almost totally fed into the shredder, the two conveyors more remote from the shredder are then accelerated to transfer the bale on the middle conveyor to the conveyor closest to the shredder. Then, all three conveyors are again slowed. This type of variable speed conveyance is unduly cumbersome and results in extensive lag time for the loading of additional bales onto the conveyor system.

A need thus exists for a reciprocating floor conveyor that compensates for cumulative error within the system to maintain the timing and synchronization of slat reciprocation.

A need thus exists for a reciprocating floor conveyor system that is able to move a load continuously despite variation of load amounts on the respective slats thereof.

A need also exists for the above type of reciprocating floor conveyor which employs substantially constant flow rate regardless of variations in flow pressure to ensure synchronous movements of the respective slats regardless of varying loads thereon.

A need also exists for the above type of reciprocating floor conveyor which resists damage from load debris.

A need also exists for the above type of reciprocating floor conveyor which provides a substantially constant load movement to facilitate consistent loading of material thereon.

SUMMARY OF THE INVENTION

In accordance with the invention, a reciprocating floor conveyor is provided. In the first embodiment of the invention, the floor conveyor has at least three groups of at least one individually reciprocated slat member each. A drive engages each slat group and moves more than half of the slat members simultaneously in a conveying direction and moves the remainder of the slat members in the opposite direction at least at about twice the rate of speed. The drive includes a fluid pressure source, a flow divider connected to the fluid pressure source which provides a separate, equal rate of flow for each slat group, a separate extensible fluid driven cylinder for reciprocation of each slat group that is connected to a separate flow from the flow divider, a direction valve for each fluid driven cylinder which controls fluid flow into and out of the cylinder, a direction valve controller, an unloading valve communicating with the interconnected rod sides of the fluid driven cylinders, and an unloading valve controller. The direction valves each have a first position in which the piston side of the fluid driven cylinder is connected to a flow from the flow divider such that the fluid driven cylinder and the engaged slat member extend, and a second position in which the rod side of the fluid driven cylinder is connected to a flow from the flow divider such that the fluid driven cylinder and the engaged slat member retract. The direction valve controller is adapted to move one of the direction valves from its first position to its second position to extend a group of slats when a first fluid driven cylinder not connected to this direction valve has partially extended and is adapted to move the direction valve from its second position to its first position to retract the group of slats when a second fluid driven cylinder not connected to this direction valve has partially extended. The unloading valve, under direction of the unloading valve controller, directs flow from the extending cylinders to the rod side of the retracting cylinder to accelerate its retraction. Upon complete retraction of the retracted cylinder, the unloading valve, under direction of the unloading valve controller, directs flow from the extending cylinders to tank. The retracted cylinder remains stationary in its retracted position until one of the extending cylinders has extended a predetermined distance, thus avoiding accumulation of minute occurrences of slat reciprocation asynchronization.

In a second embodiment, the reciprocating floor conveyor also includes reversible control valves between the connected rod sides of the cylinders, the connected piston sides of the cylinders, the rod side of each cylinder and its direction valve, and the piston side of each cylinder and its direction valve. In one configuration, these reversible valves allow forward conveying by the groups of slats, and in a second configuration the reversible valves allow reverse conveying.

BRIEF DESCRIPTION OF THE DRAWINGS

The foregoing objects and attendant advantages of this invention will become more readily appreciated as the same becomes better understood by reference to the following detailed description when taken in conjunction with the accompanying drawings wherein.

DESCRIPTION OF THE PREFERRED EMBODIMENTS

Figure 1:
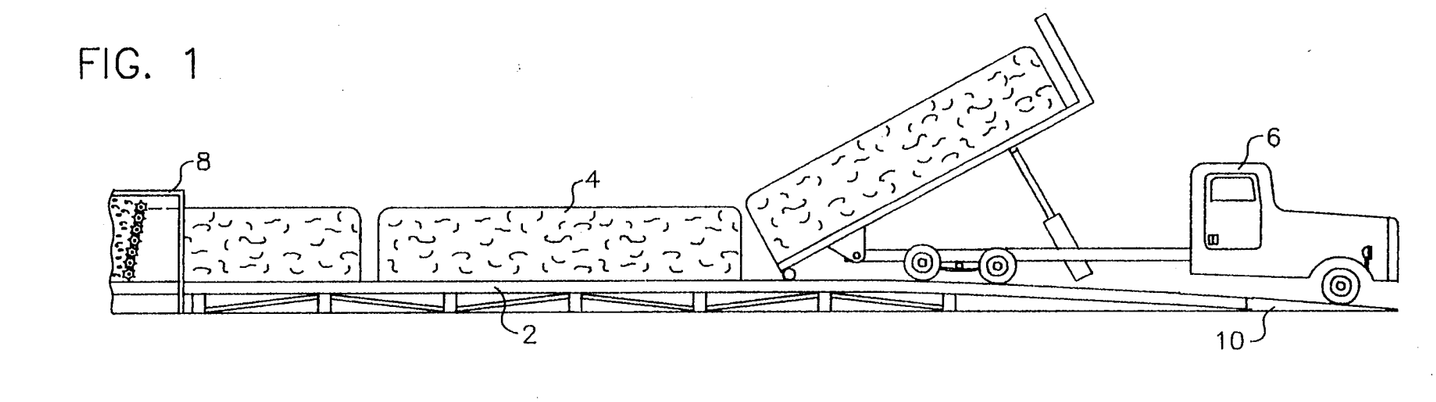
FIG. 1 is a side elevation view of the reciprocating conveyer of the present invention showing a truck unloading material thereon.

Referring first to FIG. 1, reciprocating conveyer 2 can be utilized in a variety of industrial applications such as, for example, as the load supporting bed of a truck. However, reciprocating conveyer 2 has specific utility as a feed system for large packed loads such as cotton bails 4 or the like. In this particular application, cotton bails 4 are off-loaded by truck 6 such that cotton bails 4 can then be fed into shredder 8. A unique feature of reciprocating conveyer 2 of the present invention is that truck 6 can be driven onto reciprocating conveyer 2 in order to unload cotton bails 4 by means of ramp 10 of reciprocating conveyer 2. Ramp 10 is an angled member preferably wedge shaped in cross-section which thus allows truck 6 to drive onto reciprocating conveyer 2. Additionally. reciprocating conveyer 2 preferably slopes such that reciprocating conveyer 2 is inclined with respect to shredder 8. The angle of inclination is such that the gravitational force on cotton bales 4 is less than the frictional forces of the forward moving slats.

Figure 2:
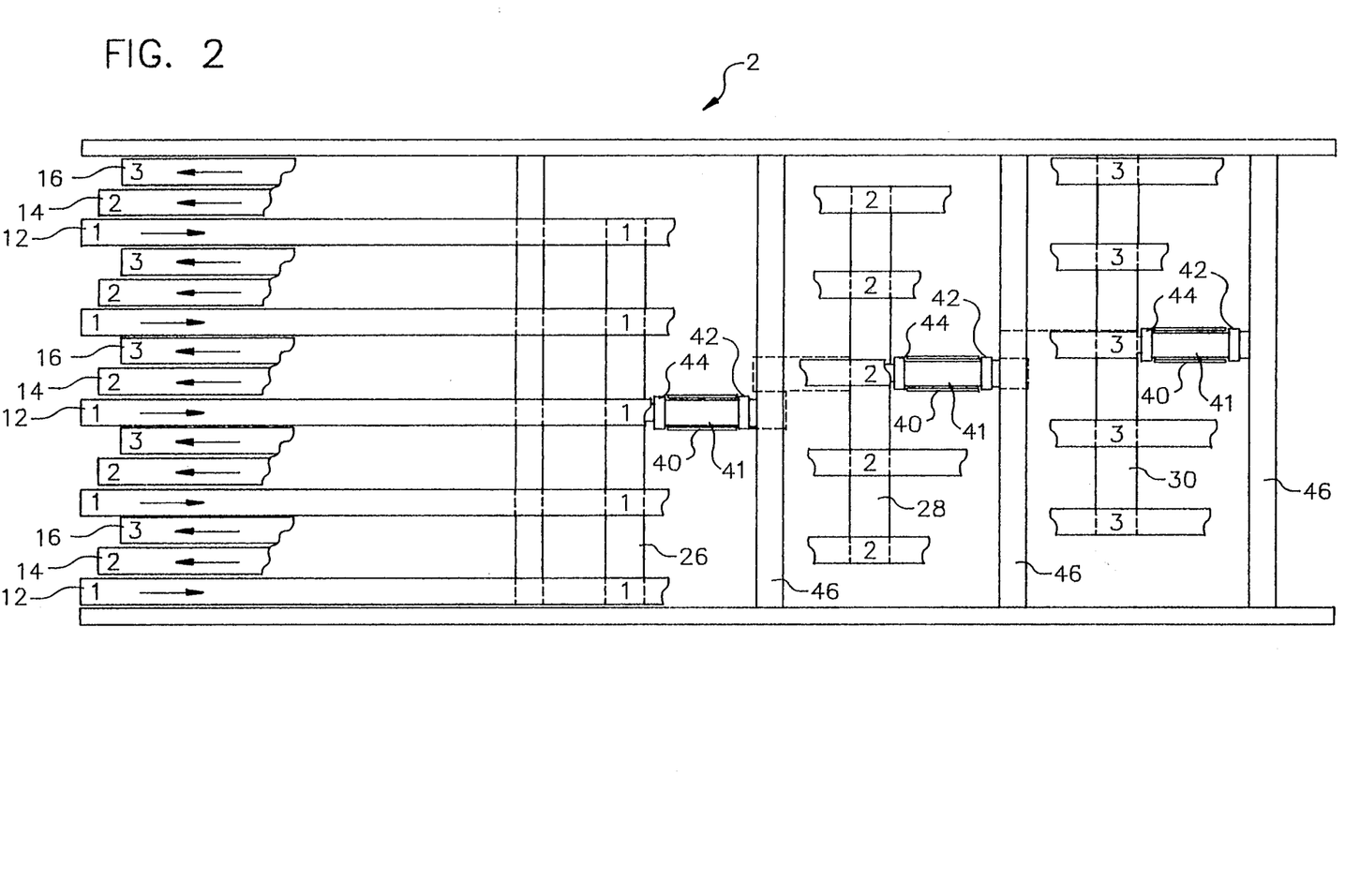
FIG. 2 is a plan view of the reciprocating conveyer of the present invention showing groups of three slats.
Figure 3:
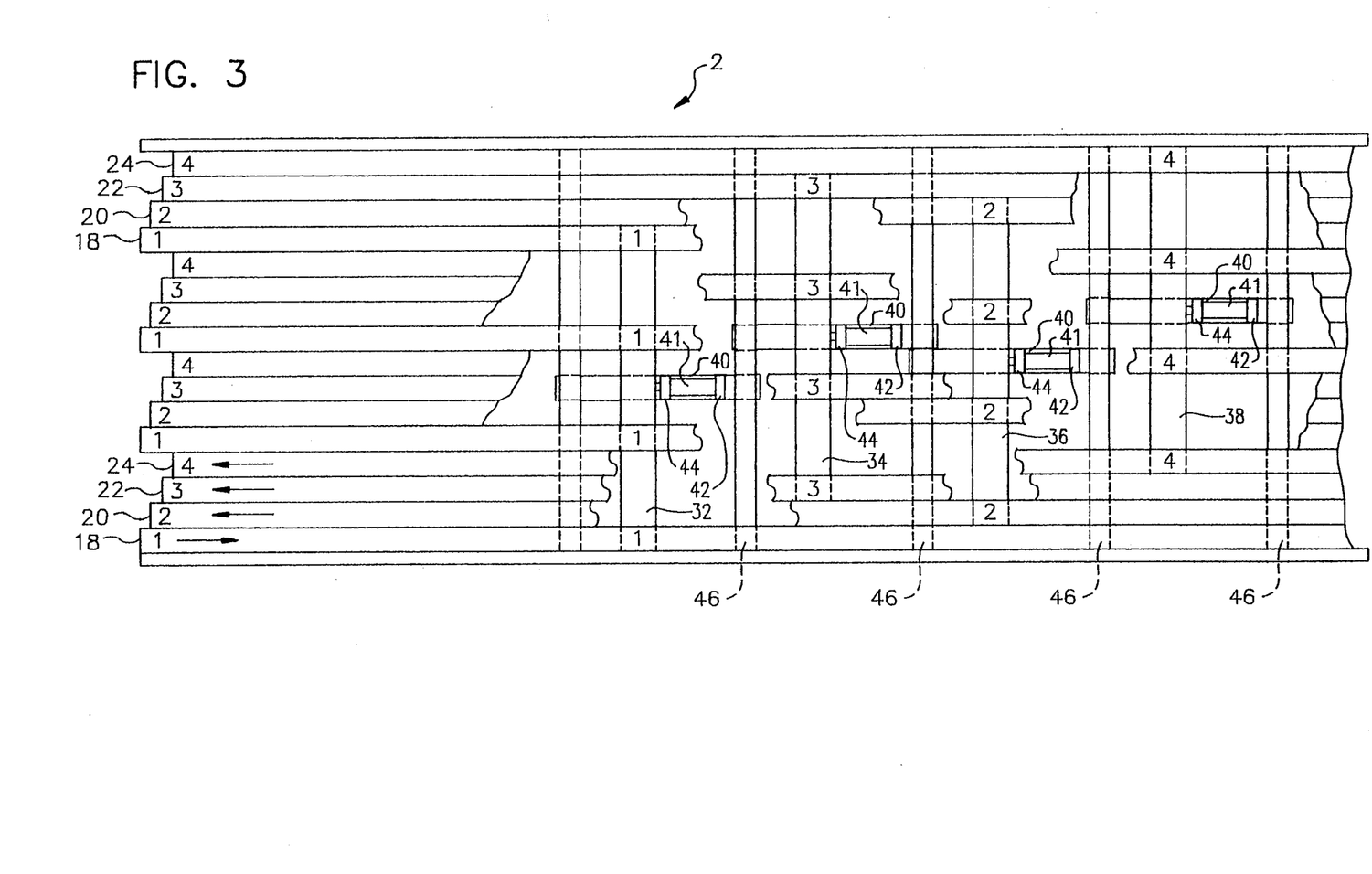
FIG. 3 is a plan view of the reciprocating conveyer of the present invention showing groups of four slats.

Referring now to FIGS. 2 through 5, reciprocating conveyer 2 comprises a plurality of groups of elongated slats extending longitudinally in the direction of conveying movement and arranged side by side. As shown in FIG. 2, each group consists of three slats 12, 14 and 16, or, as shown in FIG. 3 four slats 18, 20, 22, and 24. However, it is to be understood that each group of slats may include any desired number of slats in excess of three.

The slats of each group are configured such that each slat is capable of independent longitudinal reciprocation with respect to the other slats of that group. Thus, one slat of each separate group is interconnected for simultaneous longitudinal reciprocation. Therefore, for a reciprocating conveyer 2 in which each slat group has three slats, as shown in FIG. 2, three transverse drive beams 26, 28 and 30 are employed for slat interconnection. Where four slats per group are used in reciprocating conveyer 2, as shown in FIG. 3, four transverse drive beams 32, 34, 36 and 38 are employed.

Each of the transverse drive beams is connected to a drive cylinder 41, which is mounted on support member 40; drive cylinder 41 provides power for independent reciprocative movement of the slats of reciprocating conveyer 2. In the illustrated embodiment, drive cylinder 41 is an extensible fluid drive cylinder having a piston end 42 and a rod end 44. More specifically, piston rod 52 of cylinder 41 is secured to transverse drive beam 26, 28 and 30 or 32, 34, 36 and 38. Barrel of cylinder 41 is attached to support member 40 and to frame beams 46 which are non-moving with respect to the reciprocative slats and transverse drive beams. Thus, extension or retraction of cylinder 41 causes movement of a transverse drive beam 26 through 30 or 32 through 38 with respect to transverse frame beam 46, thus resulting in longitudinal movement of a slat 12 through 16 or 18 through 24.

Figure 5:
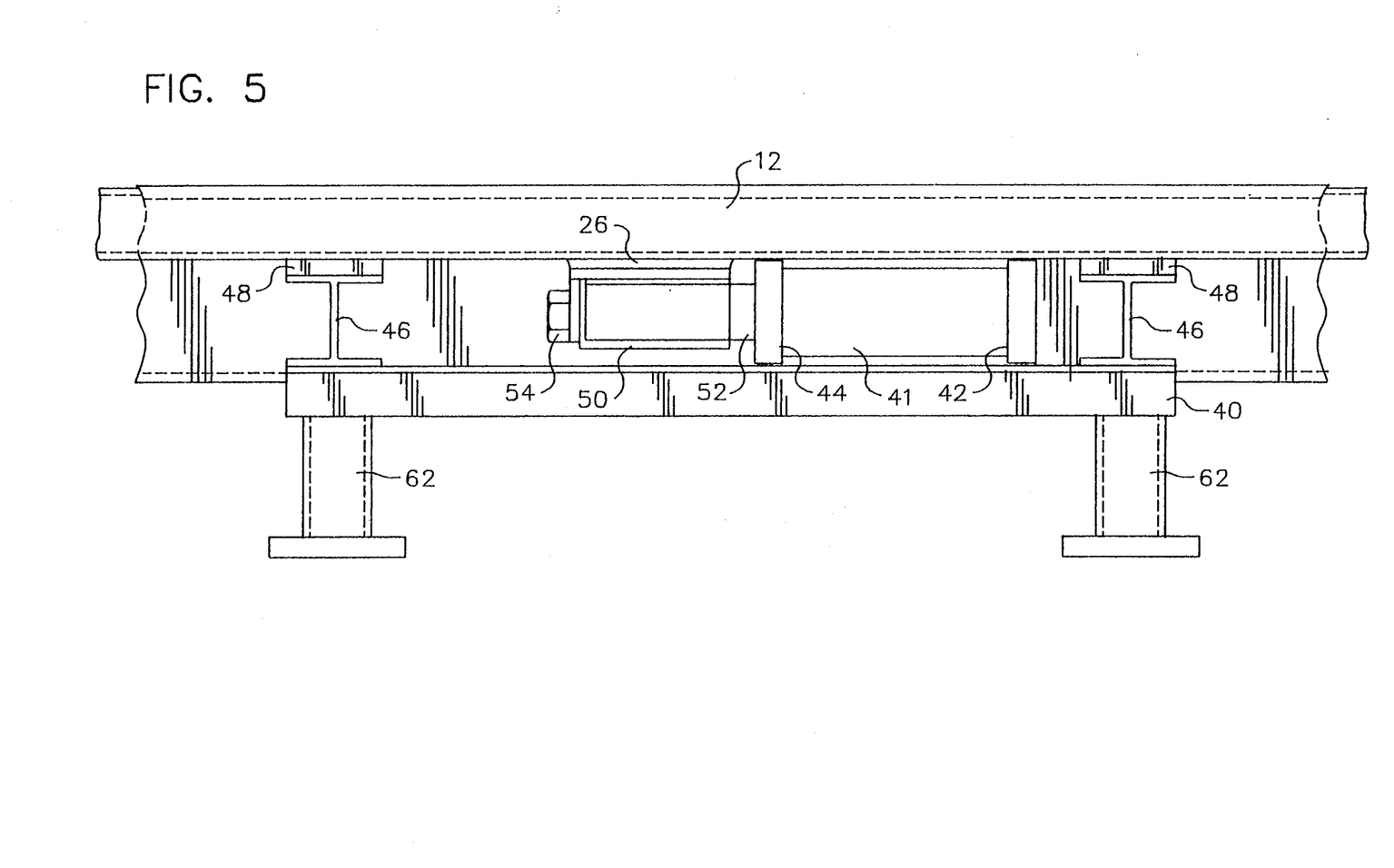
FIG. 5 is a detailed side view of the reciprocating conveyer of this present invention.

Referring specifically to FIG. 5, slats 12 through 16 or 18 through 24 are supported on transverse frame beams 46 by bearings 48, which are members known in the art that facilitate sliding reciprocation of slats. Cylinders 41 are attached to transverse drive beams 26 through 30 or 32 through 38 by cylinder bracket 50. Cylinder bracket 50 secures rod 52 of cylinder 41 therethrough by means of bolt 54. Cylinder 41 is supported under reciprocating conveyer 2 by cylinder support member 40, as stated above.

Figure 4:
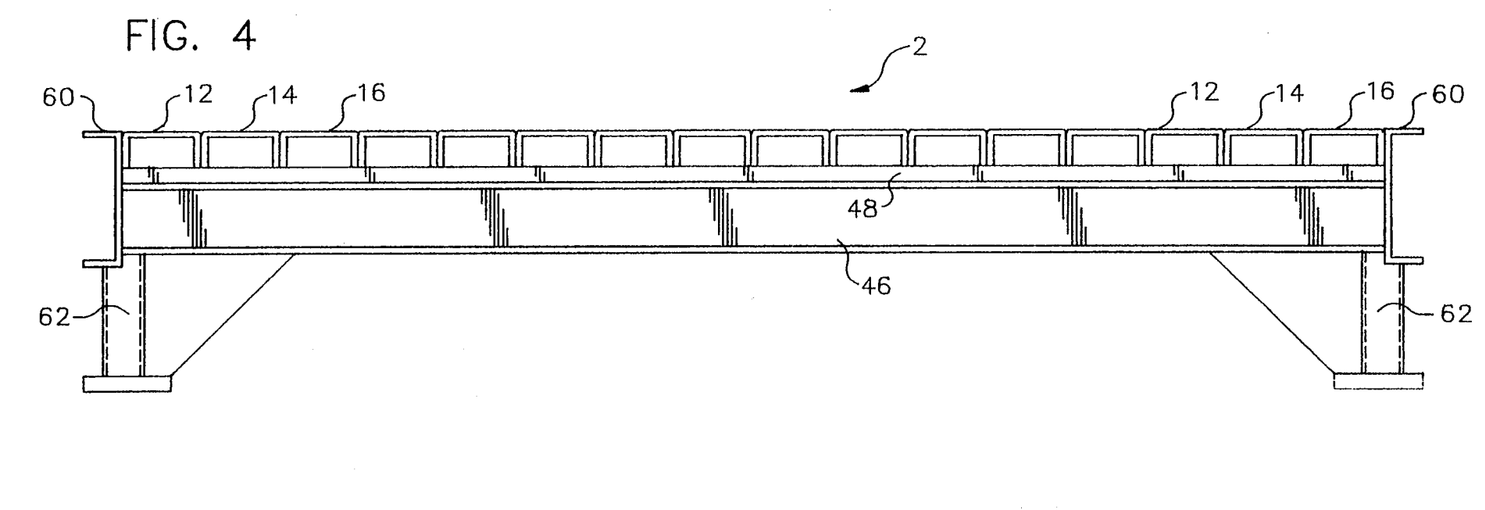
FIG. 4 is an end view of the reciprocating floor conveyer of the present invention.

Now referring to FIG. 4, slats 12 through 16 or 18 through 24 are bounded by guide beams 60 on each side of reciprocating conveyer 2. Transverse frame beams 46 are, in turn, connected to guide beams 60, and legs 62 support transverse frame beams 46 and guide beams 60 of reciprocating conveyer 2. Slats 12 through 16 or 18 through 24 are preferably comprised of structurally integral metal alloy tubing such that the slats can withstand the mass of a vehicle, such as truck 6, driven thereon to unload cotton bails 4 or the like. However, it is to be understood, that slats 12 through 16 and 18 through 24 can be comprised of other materials, such as polymers or the like, if reciprocating conveyer 2 is not intended to withstand relatively large masses.

Figure 6:
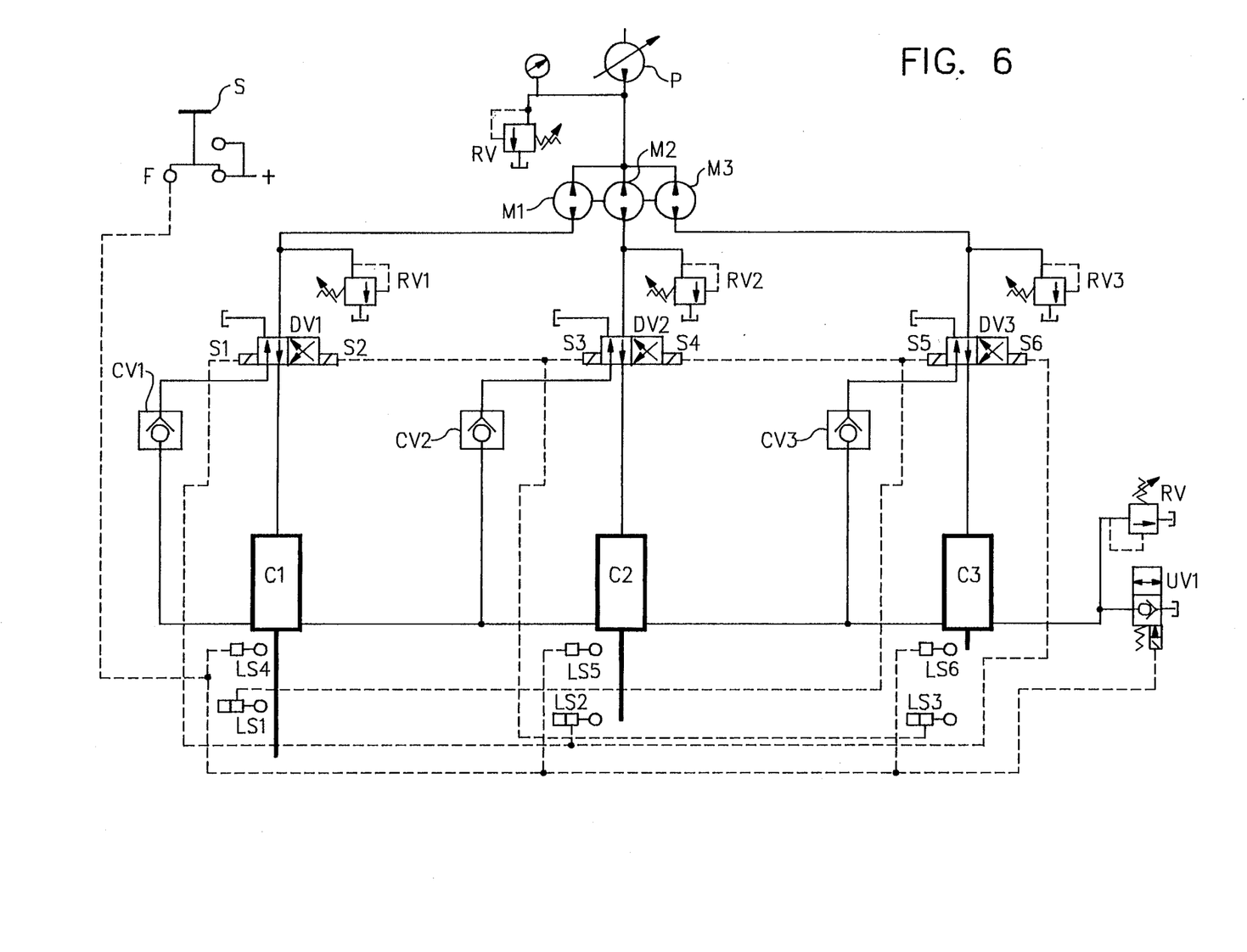
FIG. 6 is a schematic diagram of a first fluid drive system of the reciprocating conveyer of the present invention.

Referring now to FIG. 6 a first embodiment of a fluid drive system for the reciprocating conveyer of the present invention is described. Pump P, which is preferably a variable displacement pressure compensated pump designed to pump oil or other fluid, is attached to flow divider M1, M2, M3. Flow divider M1, M2, M3 is a piston, gear or gear/rotor type flow divider known in the art which is capable of precisely dividing a given input fluid flow into a predetermined number of equal output fluid flows having the same flow rates regardless of pressure differences between the output flows. The three output flows from flow divider M1, M2, M3 are connected to relief valves RV1, RV2 and RV3, respectively.

The three outputs from flow divider M1, M2 and M3 are also connected to two position, four way solenoid directional valves DV1, DV2 and DV3, respectively. Solenoid directional valves DV1, DV2 and DV3 communicate with cylinders C1, C2 and C3, respectively such that, in a first position, solenoid directional valves DV1, DV2 and DV3 communicate with the piston end of cylinders C1, C2 and C3 respectively; and in a second position, solenoid directional valves DV1. DV2 and DV3 communicate with the rod side of cylinders C1, C2 and C3 respectively. In this manner, solenoid directional valves DV1, DV2 and DV3 cause extension of cylinders C1, C2 and C3, and the slats attached thereto, when solenoid directional valves DV1, DV2 and DV3 are in the first position which allows oil to enter the piston side of cylinders C1, C2 and C3. When solenoid directional valves DV1, DV2 and DV3 are in the second position, they cause retraction of cylinders C1, C2 and C3, and the slats attached thereto, by causing oil to enter the rod side of cylinders C1, C2 and C3, respectively.

Limit switches LS1, LS2 and LS3 are electrically connected to solenoid directional valves DV1, DV2 and DV3. The functioning of limit switch LS1 is dependent upon the relative extension of cylinder C1. Likewise, the functioning of limit switches LS2 and LS3 are dependent upon the relative extension of cylinders C2 and C3, respectively. More specifically, limit switches LS1, LS2 and LS3 will be tripped when cylinders C1, C2 and C3, respectively, are extended 50% of the available stroke. Limit switches LS1, LS2 and LS3 are connected to solenoid directional valves DV1, DV2 and DV3 such that limit switch LS1 controls solenoid directional valves DV2 and DV3, limit switch LS2 controls solenoid directional valves DV1 and DV3 and limit switch LS3 controls solenoid directional valves DV1 and DV2. More specifically, limit switch LS1 controls coil S4 of solenoid directional valve DV2 and coil S5 of solenoid directional valve DV3, limit switch LS2 controls coil S6 of solenoid directional valve DV3 and coil S1 of solenoid directional valve DV1, and limit switch LS3 controls coil S2 of solenoid directional valve DV1 and coil S3 of solenoid directional valve DV2.

The rod ends of cylinders C1, C2, and C3 are all hydraulically interconnected, and each of solenoid directional valves DV1, DV2, and DV3 communicate with the line interconnecting the rod sides of cylinders C1, C2, and C3, with a check valve CV1, CV2, or CV3 located between each of solenoid directional valves DV1, DV2, and DV3 and the line providing the hydraulic interconnection of the rod sides of cylinders C1, C2, and C3. Check valves CV1, CV2, or CV3 are well known in the art and each provide unidirectional flow from one of solenoid directional valves DV1, DV2, and DV3 to the rod side of one of cylinders C1, C2, and C3. The line interconnecting the rod sides of cylinders C1, C2, and C3 terminates in unloading valve UV1 which includes relief valve RV, UV1 being a solenoid actuated valve that, in the open position, vents liquid back to the tank.

Limit switch LS4 of cylinder C1, LS5 of cylinder C2, and LS6 of cylinder C3 electrically control unloading valve UV1 such that, during initial start-up by actuation of switch S, the switching of switch LS4 by movement of cylinder C1, the switching of limit switch LS5 by movement of cylinder C2, and, finally, the switching of limit switch LS6 by movement of cylinder C3 closes unloading valve UV1 from its initially open configuration. After initial start-up, the extension of any one of cylinders C1, C2 or C3 will close unloading valve UV1 due to the switching of one of limit switches LS4, LS5 OR LS6. Likewise, the retraction of any one of cylinders C1, C2 or C3 resulting in the switching of one of limit switches LS4, LS5 or LS6, respectively, results in the opening of unloading valve UV1. More specifically, in the preferred operation of the present invention, the same cylinder (C1, C2 or C3) that causes the opening of unloading valve UV1 based upon the retraction of that cylinder and the switching of the associated limit switch (LS4, LS5 or LS6) will be the cylinder that next causes unloading valve UV1 to close based upon the extension of that cylinder and the subsequent switching of the associated limits switch (LS4, LS5 or LS6).

In operation, cylinders C1, C2, and C3 are configured in their retracted position and liquid therefrom has passed to the supply tank. Solenoid directional valve DV1 is configured such that liquid can flow to the piston side of the cylinder C1, and solenoid directional valves DV2 and DV3 are configured such that liquid can flow to the rod side of cylinder C2 and cylinder C3, respectively. The initial extension of cylinder C1 results in liquid from the rod side of cylinder C1 passing along the rod sides of cylinders C1, C2 and C3 to unloading valve UV1, which is currently configured in its open position such that fluid flows to tank. Additional liquid flows from solenoid directional valve DV2 through check valve CV2 and from solenoid directional valve DV3 to check valve CV3 because cylinder C2 and cylinder C3 are both configured such that the rod sides of these cylinders initially receive fluid flow. Upon initiation of its stroke, cylinder C1 switches limit switch LS4. After traveling approximately one-half of its available stroke, cylinder C1 actuates limit switch LS1, which in turn actuates coil S4 of solenoid directional valve DV2 to initiate piston side flow to cylinder C2, and actuates coil S5 of DV3, which maintains the rod side flow to cylinder C3. The reconfiguration of solenoid directional valve DV2 such that fluid enters the piston side of cylinder C2 results in the extension of cylinder C2, the initial extension of which switches limit switch LS5, with unloading valve UV1 remaining in its open position to allow liquid to flow to tank. After traveling about one-half of its available stroke, cylinder C2 actuates limit switch LS2, which operates switch S6 of solenoid directional valve DV3 to allow fluid flow to the piston side of cylinder C3 to start the extension of cylinder C3. Limit switch LS2 also actuates S1 of solenoid directional valve DV1 to allow fluid flow to the rod side of cylinder C1, cylinder C1 having fully extended by this time. As cylinder C3 extends, it switches limit switch LS6. Limit switches LS4, LS5 and LS6 now having all been switched; thus resulting in the closing of unloading valve UV1. Due to the closure of unloading valve UV1, flow, from the rod sides of the extending cylinders C2 and C3 as well as from flow divider M1 via CV1, enters the rod side of cylinder C1 to cause retraction of cylinder C1 at a substantially greater rate than the extension thereof. Thus, cylinder C1 retracts in its entirety before cylinder C3 attains one-half extension and cylinder C2 attains full extension. Upon full retraction, cylinder C1 switches limit switch LS4 which opens unloading valve UV1, again allowing flow to pass to tank. Importantly, the maintenance of cylinder C1 in the retracted position until cylinder C3 reaches its one-half extension and until cylinder C2 fully extends avoids additive error caused by, for example, imprecise fluid flow division by flow divider F, or uneven distribution of the transported load on the slats associated with the subject drive system. The fact that the retracted cylinder maintains its retracted configuration until the two extending cylinders reach their respective one-half extended or fully extended positions provides a system which essentially recalibrates or self-calibrates cylinder timing or slat synchronization.

After traveling approximately one-half of its available stroke, cylinder C3 actuates limit switch LS3, which in turn actuates coil S2 of solenoid directional valve DV1 to initiate piston side flow to extend cylinder C1, and actuates coil S3 of DV2, to initiate rod side flow to retract cylinder C2. The reconfiguration of solenoid directional valve DV1 such that fluid enters the piston side of cylinder C1 results in the extension of cylinder C1, the initial extension of which switches limit switch LS4 to close unloading valve UV1 to prevent liquid to flow to tank. Due to the closure of unloading valve UV1, flow, from the rod sides of the extending cylinders C1 and C3 as well as from flow divider M2 via CV2 enters the rod side of cylinder C2 to cause retraction of cylinder C2 at a substantially greater rate than the extension thereof. Thus, cylinder C2 retracts in its entirety before cylinder C1 attains one-half extension and cylinder C3 attains full extension. Upon full retraction, cylinder C2 switches limit switch LS5 which opens unloading valve UV1, again allowing flow to pass to tank. Cylinder C2 maintains its retracted position until cylinder C1 reaches its one-half extension.

After traveling approximately one-half of its available stroke, cylinder C1 actuates limit switch LS1, which in turn actuates coil S4 of solenoid directional valve DV2 to initiate piston side flow to extend cylinder C2, and actuates coil S5 of DV3, to initiate rod side flow to retract cylinder C3. The reconfiguration of solenoid directional valve DV2 such that fluid enters the piston side of cylinder C2 results in the extension of cylinder C2, the initial extension of which switches limit switch LS5 to close unloading valve UV1 to prevent liquid to flow to tank. Due to the closure of unloading valve UV1, flow, from the rod sides of the extending cylinders C1 and C2 as well as from flow divider M3 via CV3, enters the rod side of cylinder C3 to cause retraction of cylinder C3 at a substantially greater rate than the extension thereof. Thus, cylinder C3 retracts in its entirety before cylinder C2 attains one-half extension and cylinder C1 attains full extension. Upon full retraction, cylinder C3 switches limit switch LS6 which opens unloading valve UV1, again allowing flow to pass to tank. Cylinder C3 maintains its retracted position until cylinder C2 reaches its one-half extension.

After traveling approximately one-half of its available stroke, cylinder C2 actuates limit switch LS2, which in turn actuates coil S6 of solenoid directional valve DV3 to initiate piston side flow to extend cylinder C3, and actuates coil S1 of DV1 to initiate rod side flow to retract cylinder C1. The reconfiguration of solenoid directional valve DV3 such that fluid enters the piston side of cylinder C3 results in the extension of cylinder C3, the initial extension of which switches limit switch LS6 to close unloading valve UV1 to prevent liquid to flow to tank. Due to the closure of unloading valve UV1, flow, from the rod sides of the extending cylinders C2 and C3 as well as from flow divider M1 via CV1, enters the rod side of cylinder C1 to cause retraction of cylinder C1 at a substantially greater rate than the extension thereof. Thus, cylinder C1 retracts in its entirety before cylinder C3 attains one-half extension and cylinder C3 attains full extension. Upon full retraction, cylinder C1 switches limit switch LS5 which opens unloading valve UV1, again allowing flow to pass to tank. Cylinder C1 maintains its retracted position until cylinder C3 reaches its one-half extension.

Figure 7:
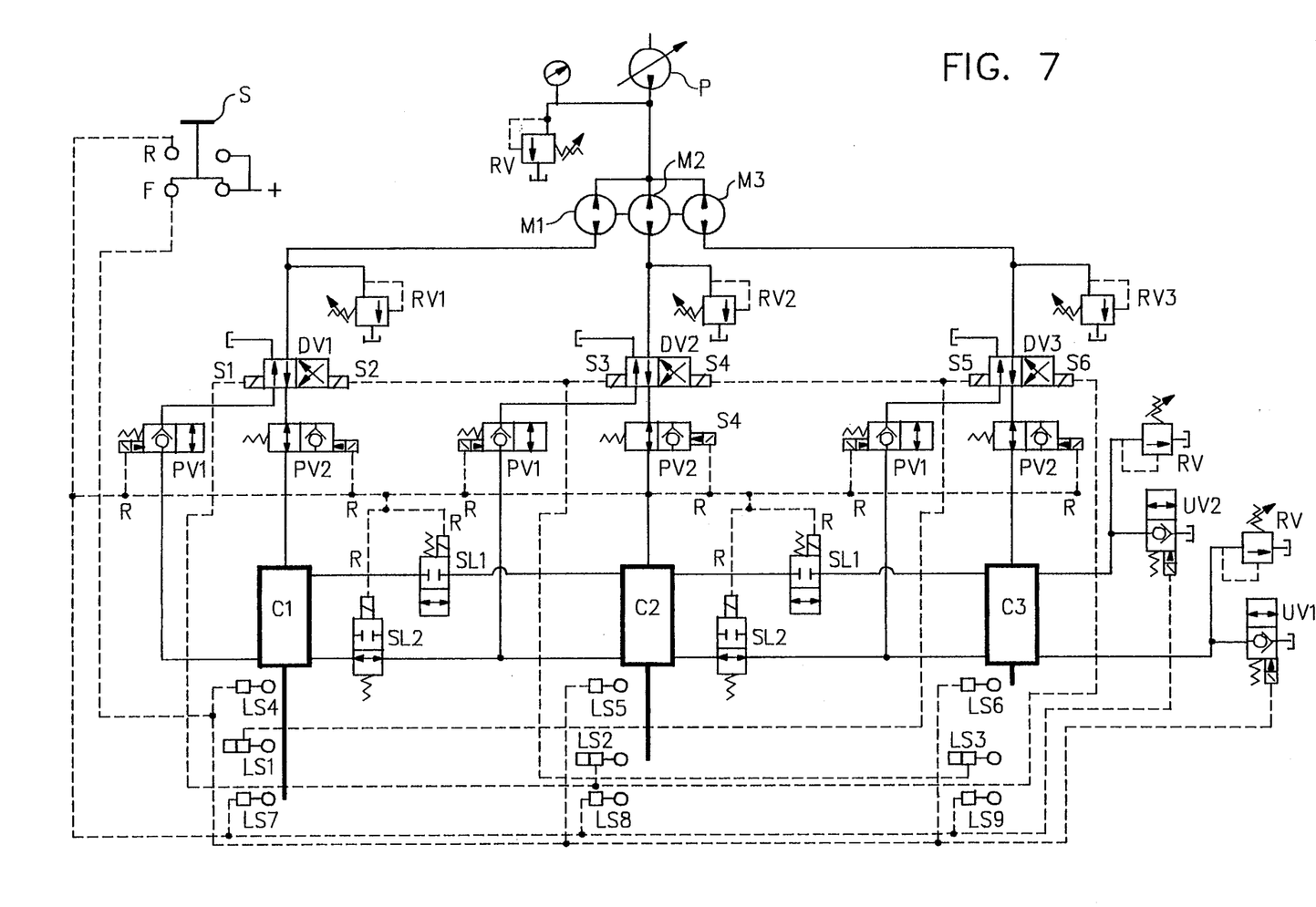
FIG. 7 is a schematic diagram of a second fluid drive system of the reciprocating conveyer of the present invention.

The above sequence is cyclically repeated until the drive is de-energized. While the above embodiment was shown employing three drive cylinders for exemplary purposes, it is to be understood that more cylinders than three, with associated limit switches and directional valves, can also be employed, The embodiment of FIG. 6 discloses a hydraulic system which is not reversible. As shown in FIG. 7, an embodiment of the present invention is disclosed in which the hydraulic system is reversible. Elements present in FIG. 7 which are also present in FIG. 6 have like element notations. The embodiment of FIG. 7 has all of the elements of FIG. 6 except that check valves CV1, CV2 and CV3 of FIG. 6 have each been replaced with an electrically controlled valve PV1 known in the art. In FIG. 7, between each of solenoid directional control valves DV1, DV2 and DV3 and cylinders C1, C2 and C3, an electrically controlled valve PV2 is present. Two electrically controlled valves SL2 are located between the three cylinders C1, C2 and C3 and are interconnected with the line that communicates the rod ends of cylinders C1, C2 and C3 with unloading valve UV1. A line communicates the piston ends of cylinders C1, C2 and C3 with a second unloading valve UV2, and this line has two electrically controlled valves SL1 therein.

In forward operation, valves PV2 are configured as two way valves and valves PV1 are configured as one way valves allowing flow to the cylinder rod sides. Valves SL2 are open and valves SL1 are closed to isolate the piston sides of cylinders C1, C2 and C3. In reverse operation, valves PV1 are configured as two way valves and valves PV2 are configured as one way valves allowing flow to the cylinder piston sides. Valves SL1 are open and valves SL2 are closed to isolate the piston sides of cylinders C1, C2 and C3.

While preferred embodiments of the invention have been illustrated and described, it will be appreciated that various changes can be made therein without departing from the spirit and scope of the invention.

I claim:

1. A reciprocating conveyor comprising:
    at least three groups of at least one slat member each, each of said slat members being individually reciprocatable; and
    drive means engaging each slat member and operable to move more than half of said slat members simultaneously in a conveying direction and to move a remainder of said slat members in an opposite direction, said drive means comprising:
        a fluid pressure source providing a plurality of fluid flows having substantially equal and constant flow rates;
        an extensible fluid driven cylinder for reciprocation of each slat group connected to one of said plurality of fluid flows having substantially equal and constant flow rates from said fluid pressure source, each of said fluid driven cylinders being divided into a piston side and a rod side, said rod side of each of said fluid driven cylinders connected to a rod side of said fluid driven cylinder adjacent thereto;
        a direction valve means for each fluid driven cylinder, each of said direction valve means having a first position in which said piston side of said fluid driven cylinder is connected to one of said plurality of fluid flows having substantially equal and constant flow rates from said fluid pressure source, such that said fluid driven cylinder and said engaged slat member extend, and a second position in which said rod side of said fluid driven cylinder is connected to one of said plurality of fluid flows having substantially equal and constant flow rates from said fluid pressure source, such that said fluid driven cylinder and said engaged slat member retract;
        unloading valve means having a first closed position in which flow from said fluid driven cylinders that are extending is directed to said rod side of said fluid driven cylinder that is retracting and a second open position in which flow from said fluid driven cylinders that are extending is directed to said fluid pressure source;
        means for controlling said direction valve means such that said direction valve means is moved from its first position to its second position when one of said fluid driven cylinders has partially extended a predetermined distance, and said direction valve means is moved from its second position to its first position when a different one of said fluid driven cylinders has partially extended a predetermined distance; and
        means for controlling said unloading valve means such that said unloading valve means is moved from its first closed position to its second open position when one of said fluid driven cylinders completes retracting, and said unloading valve means is moved from its second open position to its first closed position when said one of said fluid driven cylinders begins extending whereby said one of said fluid driven cylinders remains stationary and does not begin extending until after another of said fluid driven cylinders partially extends a predetermined distance.

2. The reciprocating conveyor of claim 1 wherein said drive means further comprises:
    means for reversing a direction of reciprocation of said slat groups.

3. The reciprocating conveyor of claim 2 wherein said means for reversing the direction of reciprocation of said slat groups comprises:
    first reversible control valves connecting said rod sides of said fluid driven cylinders and communicating with said unloading valve;
    second reversible control valves connecting said piston sides of said fluid driven cylinders and communicating with a second unloading valve;
    third reversible control valves between said rod side of each of said fluid driven cylinders and each of said direction valve means;
    fourth reversible control valves between said piston side of each of said fluid driven cylinders and each of said direction valve means;
    means for controlling said second unloading valves means; and
    means for reversing said first reversible control valves, said second reversible control valves, said third reversible control valves and said fourth reversible control valves to reverse the direction of fluid flow.

4. The reciprocating conveyor of claim 1 wherein said fluid pressure source provides flows of substantially equal rate regardless of fluid pressure differences between the flows.

5. The reciprocating conveyor of claim 1 further comprising a plurality of relief valve means communicating with a plurality of outlets of said fluid pressure source.

6. The reciprocating conveyor of claim 1 wherein said fluid driven cylinders are adapted to retract at a greater rate of speed than a rate at which said fluid driven cylinders extend.

7. The reciprocating conveyor of claim 1 further comprising:
    an angled ramp adjacent said group of slats whereby a vehicle can access said ramp to transfer a load onto said reciprocating conveyor.

8. A drive means for a reciprocating conveyor having at least three groups of at least one slat member each, each of the slat members being individually reciprocatable, said drive means engaging each slat member and operable to move more than half of the slat members simultaneously in a conveying direction and to move a remainder of the slat members in an opposite direction, said drive means comprising:
    a fluid pressure source providing a plurality of fluid flows having substantially equal and constant flow rates;
    an extensible fluid driven cylinder for reciprocation of each slat group connected to one of said plurality of fluid flows having substantially equal and constant flow rates from said fluid pressure source, each of said fluid driven cylinders being divided into a piston side and a rod side, said rod side of each of said fluid driven cylinders connected to a rod side of said fluid driven cylinder adjacent thereto;
    a direction valve means for each fluid driven cylinder, each of said direction valve means having a first position in which said piston side of said fluid driven cylinder is connected to one of said plurality of fluid flows having substantially equal and constant flow rates from said fluid pressure source such that said fluid driven cylinder and said engaged slat member extend, and a second position in which said rod side of said fluid driven cylinder is connected to one of said plurality of fluid flows having substantially equal and constant flow rates from said fluid pressure source such that said fluid driven cylinder and said engaged slate member retract;

unloading valve means having a first closed position in which flow from said fluid driven cylinders that are extending is directed to said rod side of said fluid driven cylinder that is retracting and a second open position in which flow from said fluid driven cylinders that are extending is directed to said fluid pressure source;

means for controlling said direction valve means such that said direction valve means is moved from its first position to its second position when one of said fluid driven cylinders has partially extended a predetermined distance, and said direction valve means is moved from its second position to its first position when a different one of said fluid driven cylinders has partially extended a predetermined distance; and means for controlling said unloading valve means such that said unloading valve means is moved from its first closed position to its second open position when one of said fluid driven cylinders completes retracting, and said unloading valve means is moved from its second open position to its first closed position when said one of said fluid driven cylinders begins extending whereby said one of said fluid driven cylinders remains stationary and does not begin extending until after another of said fluid driven cylinders partially extends a predetermined distance.

9. The drive means of claim 8 further comprising:
means for reversing a direction of reciprocation of said slat groups.

10. The drive means of claim 9 wherein said means for reversing the direction of reciprocation of said slat groups comprises:
first reversible control valves connecting said rod sides of said fluid driven cylinders and communicating with said unloading valve;
second reversible control valves connecting said piston sides of said fluid driven cylinders and communicating with a second unloading valve;
third reversible control valves between said rod side of each of said fluid driven cylinders and each of said direction valve means;
fourth reversible control valves between said piston side of each of said fluid driven cylinders and each of said direction valve means;
means for controlling said second unloading valves means; and
means for reversing said first reversible control valves, said second reversible control valves, said third reversible control valves and said fourth reversible control valves to reverse the direction of fluid flow.

11. The drive means of claim 8 wherein said fluid pressure source provides flows of substantially equal rate regardless of fluid pressure differences between the flows.

12. The drive means of claim 8 further comprising a plurality of relief valve means communicating with a plurality of outlets of said fluid pressure source.

13. The drive means of claim 8 wherein said fluid driven cylinders are adapted to retract at a greater rate of speed than a rate at which said fluid driven cylinders extend.

14. The drive means of claim 8 wherein the reciprocating conveyor includes an angled ramp adjacent the groups of slats whereby a vehicle can access said ramp to transfer a load onto the reciprocating conveyor.

15. A drive means for a reciprocating conveyor having at least three groups of at least one slat member each, each of the slat members being individually reciprocatable, said drive means engaging each slat member and operable to move more than half of the slat members simultaneously in a conveying direction and to move a remainder of the slat members in an opposite direction, said drive means comprising:

a fluid pressure source providing a plurality of fluid flows having substantially equal and constant flow rates;

an extensible fluid driven cylinder for reciprocation of each slat group connected to one of said plurality of fluid flows having substantially equal and constant flow rates from said fluid pressure source, each of said fluid driven cylinders being divided into a piston side and a rod side, said rod side of each of said fluid driven cylinders connected to a rod side of said fluid driven cylinder adjacent thereto;

a direction valve means for each fluid driven cylinder, each of said direction valve means having a first position in which said piston side of said fluid driven cylinder is connected to one of said plurality of fluid flows having substantially equal and constant flow rates from said fluid pressure source such that said fluid driven cylinder and said engaged slat member extend, and a second position in which said rod side of said fluid driven cylinder is connected to one of said plurality of fluid flows having substantially equal and constant flow rates from said fluid pressure source such that said fluid driven cylinder and said engaged slat member retract;

unloading valve means having a first closed position in which flow from said fluid driven cylinders that are extending is directed to said rod side of said fluid driven cylinder that is retracting and a second open position in which flow from said fluid driven cylinders that are extending is directed to said fluid pressure source;

means for controlling said direction valve means such that said direction valve means is moved from its first position to its second position when one of said fluid driven cylinders has partially extended a predetermined distance, and said direction valve means is moved from its second position to its first position when a different one of said fluid driven cylinders has partially extended a predetermined distance;

means for controlling said unloading valve means such that said unloading valve means is moved from its first closed position to its second open position when one of said fluid driven cylinders completes retracting, and said unloading valve means is moved from its second open position to its first closed position when said one of said fluid driven cylinders begins extending whereby said one of said fluid driven cylinders remains stationary and does not begin extending until after another of said fluid driven cylinders partially extends a predetermined distance;

first reversible control valve means connecting said rod sides of said fluid driven cylinders and communicating with said unloading valve;

second reversible control valve means connecting said piston sides of said fluid driven cylinders and communicating with a second unloading valve;

third reversible control valve means between said rod side of each of said fluid driven cylinders and each of said direction valve means;

fourth reversible control valve means between said piston side of each of said fluid driven cylinders and each of said direction valve means;

means for controlling said second unloading valves means; and means for reversing said first reversible control valve means, said second reversible control valve means, said third reversible control valve means and said fourth reversible control valve means to reverse the direction of fluid flow.

16. The drive means of claim 15 wherein said fluid pressure source provides flows of substantially equal rate regardless of fluid pressure differences between the flows.

17. The drive means of claim 15 further comprising a plurality of relief valve means communicating with a plurality of outlets of said fluid pressure source.

18. The drive means of claim 15 wherein said fluid driven cylinders are adapted to retract at a greater rate of speed than a rate at which said fluid driven cylinders extend.

19. The drive means of claim 15 wherein the reciprocating conveyor includes an angled ramp adjacent the groups of slats whereby a vehicle can access said ramp to transfer a load onto the reciprocating conveyor.

* * * * *